(12) United States Patent
Silyaev et al.

(10) Patent No.: US 7,987,345 B2
(45) Date of Patent: Jul. 26, 2011

(54) PERFORMANCE MONITORS IN A MULTITHREADED PROCESSOR ARCHITECTURE

(75) Inventors: Vladimir Silyaev, Irvine, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 880 days.

(21) Appl. No.: 11/864,368

(22) Filed: Sep. 28, 2007

(65) Prior Publication Data
US 2009/0089014 A1    Apr. 2, 2009

(51) Int. Cl.
*G06F 11/30*    (2006.01)
(52) U.S. Cl. ......................... 712/227; 717/127
(58) Field of Classification Search .................. None
See application file for complete search history.

(56) References Cited

U.S. PATENT DOCUMENTS

| | | | | |
|---|---|---|---|---|
| 5,463,775 A * | 10/1995 | DeWitt et al. | ................. | 702/186 |
| 5,796,939 A * | 8/1998 | Berc et al. | ................. | 714/47 |
| 5,835,705 A * | 11/1998 | Larsen et al. | ................. | 714/47 |
| 6,052,708 A * | 4/2000 | Flynn et al. | ................. | 718/108 |
| 6,098,169 A * | 8/2000 | Ranganathan | ................. | 712/227 |
| 6,256,775 B1 * | 7/2001 | Flynn | ................. | 717/127 |
| 7,197,652 B2 * | 3/2007 | Keller et al. | ................. | 713/320 |
| 7,779,238 B2 * | 8/2010 | Kosche et al. | ................. | 712/227 |

* cited by examiner

*Primary Examiner* — Eric Coleman
(74) *Attorney, Agent, or Firm* — Brake Hughes Bellermann LLP

(57) ABSTRACT

A system comprising a plurality of execution units configured to execute, at least in part, a plurality of instruction threads; a plurality of performance monitors, each performance monitor being configured to collect performance information related to the execution of at least one instruction thread; a selected thread identifier configured to provide, during operation, the selection of at least one instruction thread; and a performance manager configured to filter, utilizing the selected thread, the information collected by the plurality of performance monitors.

20 Claims, 3 Drawing Sheets

100

200

PERFORMANCE MONITORS IN A MULTITHREADED PROCESSOR ARCHITECTURE

TECHNICAL FIELD

This description relates to monitoring the performance of a processor, and more specifically to monitoring the performance of a selected instruction thread in a multi-threaded processor architecture.

BACKGROUND

Typically a processor or central processing unit (CPU) may be thought of a black box. A program or series of instructions may be executed by the processor with only the inputs and outputs of the instruction series known. This may frustrate a programmer's desire to understand how their program is performing and where in the series of instructions optimizations may be made.

Some processors have added performance monitors to assist the programmer or other processor user in understanding how the processor is executing a given series of instructions. Typically the performance monitors may be thought of as monitoring two different tasks: general workload characterization and event counting. Often workload characterization monitors how much work a series of instructions took to perform. For example, the amount of time spent executing the series of instructions may be monitored. Conversely, event counting monitors are often simple counters that count how often a processor or portion of a processor has performed a certain task. In one example, a performance monitor may count the number of cache misses encountered. Typically, the performance monitors count or monitor all the events or the workload of the processor regardless of what series of instructions are being performed.

The term "thread" or "instruction thread" in computer science is typically short for a thread of execution. In this context, a thread may be a series of instructions that are relatively autonomous and self-contained. Frequently, a thread may receive input from another thread before an action may be performed. Likewise, a thread typically returns information to another thread. In some embodiments, a thread may comprise a subroutine, an object, or a plurality of instructions grouped together to perform a task.

In modern processing systems, multiple threads can be executed substantially in parallel. This multithreading generally occurs by time slicing or time-division multiplexing, wherein a single processor switches between different threads, in which case the processing is not literally simultaneous, for the single processor is really doing only one thing at a time. This switching can happen so fast as to give the illusion of simultaneity to an end user.

In more complex processor systems, multiple threads may be capable of executing in parallel. For example, a processor may have three arithmetic logic units (ALUs, capable of performing simple arithmetic) and two floating-point units (FPUs, capable of performing more complex arithmetic). In this example, the processor may actually be able to execute five threads simultaneously, if the execution requirements of the five threads happen to align with the available exaction units.

Also, due to the pipelining nature of modern processors, which breaks the total execution of an instruction into smaller execution steps, a first thread may be executing in the front of the pipeline, while other threads are executing in the middle or end of the pipeline. For example, a first thread may be executed by the Instruction Fetch Unit (IFU, which may read an instruction from memory), while a second thread may be further along in the pipeline and executed by the Instruction Decode Unit (IDU, which may determine what type of further execution an instruction requires), a third thread may be executed by the ALU, and a forth thread may be executed by the write-back unit (WBU, which may write the results of an instructions execution back to memory).

SUMMARY

The details of one or more implementations are set forth in the accompanying drawings and the description below. Other features will be apparent from the description and drawings, and from the claims.

DETAILED DESCRIPTION

Figure 1:
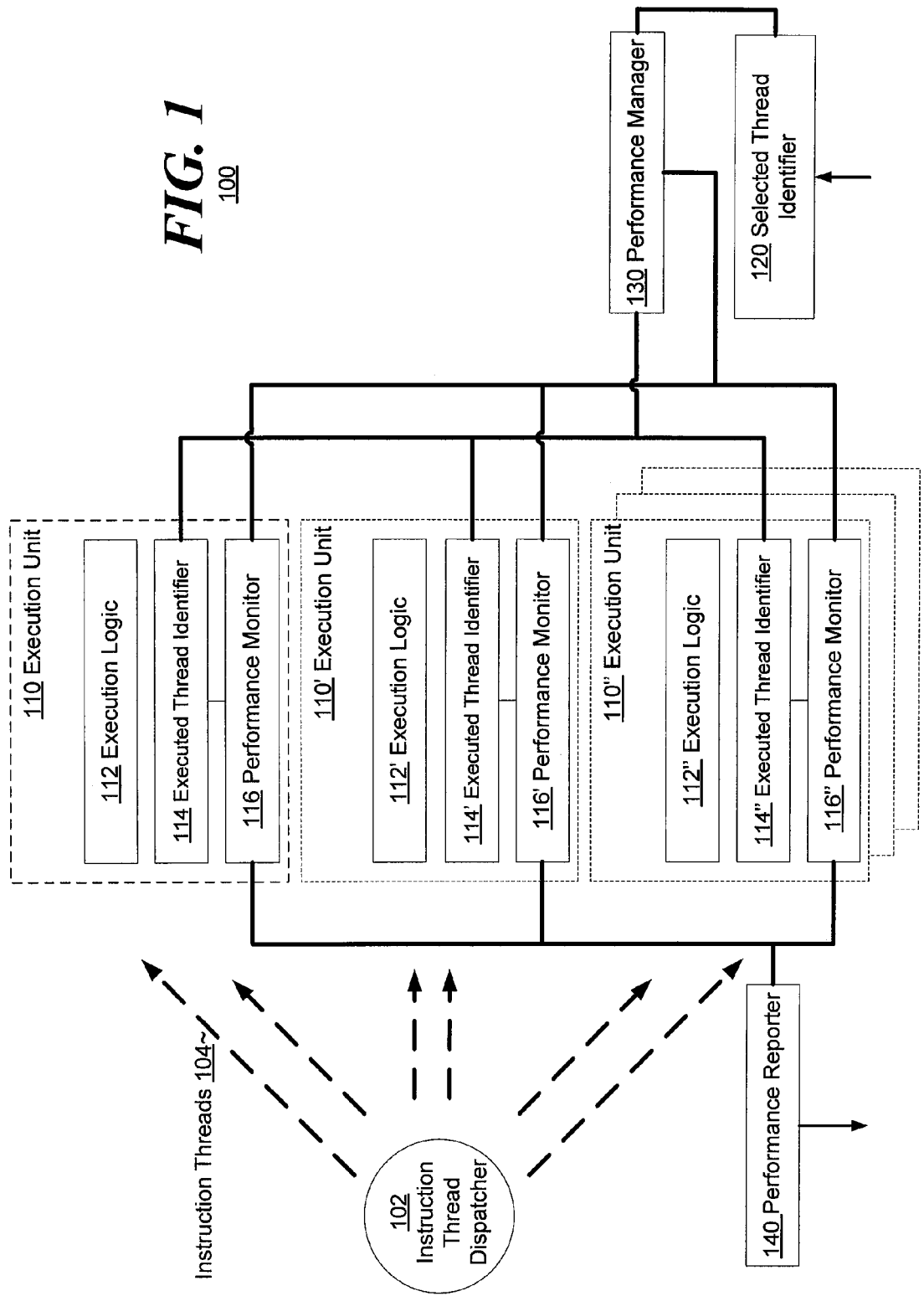
FIG. 1 is a block diagram of an embodiment of a system for the monitoring of processor performance in accordance with the disclosed subject matter.

FIG. 1 is a block diagram of an embodiment of a system 100 for the monitoring of processor performance in accordance with the disclosed subject matter. In one embodiment, a system 100 may include a plurality of execution units 110, et seq., a plurality of performance monitors 116, et seq., a selected thread identifier 120, and a performance manager 130. In one embodiment, the system 100 may be capable of monitoring the performance for a single selected instruction thread being executed in a multi-threaded processing environment. In one embodiment, the system 100 may include a processor or a central processing unit (CPU).

In one embodiment, the plurality of execution units 110 may be configured to execute, at least in part, a plurality of instruction threads 104. In one embodiment, the system 100 may be capable of substantially simultaneously executing multiple threads. FIG. 1 illustrates at least three execution units 110, 110' & 110" with execution logic 112, 112' & 112", executed thread identifier 114, 114' & 114", and performance monitors 116, 116' & 116". In one embodiment, these execution units may be substantially identical. However, it is contemplated that in other embodiments, the execution units may differ.

In one embodiment, the instruction threads 104 may be assigned to an execution unit by the instruction thread dispatcher 102. For example, in one embodiment, one execution unit may be an arithmetic logic unit (ALU), one a floating-point unit (FPU) and a Single Instruction, Multiple Data Unit (SIMD). The instruction thread dispatcher 102 may examine the thread and determine which form of execution is requested by the thread. In one embodiment, these execution units may be capable of executing separate threads substantially simultaneously.

It is understood that while the traditional textbook processor pipeline may have five pipe stages (Instruction fetch, Instruction decode, Execute, Memory access, and Write back) that the term "execution unit", in this context is not limited only to units involved in the execute pipe stage. In this context an execution unit may include any logical functional unit block (FUB) that performs an operation or utilizes the instruction thread, regardless or where in the pipeline the FUB conceptually resides. Therefore, the instruction thread dispatcher 102 may be considered an execution unit even through it may conceptually reside in the Instruction Decode stage. Furthermore, it is understood that the disclosed subject matter is not limited to any number of pipe stages or even a pipelined architecture.

In one embodiment, each of the execution units 110 may include a executed thread identifier 114 configured to indicate which of the plurality of instruction threads 104 the execution unit is currently executing. In one embodiment, each of the instruction threads 114 may be assigned a sufficiently unique number that indentifies or colors the thread. In one embodiment, the execution units 110, 110' & 110" may be executing three different threads. Therefore, their corresponding executed thread identifiers 114, 114' & 114" may hold or store three different numbers, each number associated with the current thread being executed. In one embodiment, the value stored by the executed thread identifier 114 may change as the thread being executed by the execution unit 110 changes. In one embodiment, each execution unit 110, 110' & 110" may include execution logic 112, 112' & 112" that ultimately performs the execution operations on the executed thread.

In one embodiment, each of the execution units 110 may include a subset of the performance monitors 116, wherein the subset of performance monitors may be configured to monitor events related with the execution unit. For example, in one embodiment, the execution 110 may include performance monitor 116, while execution unit 110' may include performance monitor 116', and execution unit 110" may include performance monitor 116". In one illustrative embodiment, a performance monitor residing within a cache related to an execution unit may monitor the number of cache hits, cache misses, and/or other cache related information. Conversely, in another illustrative embodiment, a performance monitor residing within a branch prediction related execution unit may monitor the number of encountered instruction branches, the number of predicted instruction branches, and/or the number of correct predictions. It is understood, however, that these are merely a few illustrative embodiments, to which the disclosed subject matter is not limited. In one embodiment, a subset of performance monitors may reside, conceptually, outside of a particular execution unit and monitor system-wide or cross-execution unit performance.

In one embodiment, the plurality of performance monitors 114 may be configured to collect performance information related to the execution of at least one instruction thread 104. In one embodiment, the plurality of performance monitors may be configured to collect information related to the execution of a plurality of instruction threads 104. In one embodiment, a performance monitor 116 may be associated with an execution unit 110 or execution logic 112, and configured to collect performance information related to the execution unit 110, regardless of which instruction thread is actively being executed by the execution unit 110.

In one embodiment, the selected thread identifier 120 may be configured to provide, during operation, selection of at least one instruction thread. In one embodiment, a user may select a particular thread to be monitored from amongst the plurality of instruction threads 104. In one embodiment, the thread may be selected as a result of a user-configured event. For example, in one embodiment, a particular thread may be selected if a particular instruction branch is taken, a memory access occurs, or a processor exception occurs, etc.; it is understood, however, that these are merely a few example conditions and that the disclosed subject matter is not so limited. In one embodiment, the selected thread identifier may include a thread mask configured to provide the selection of a plurality of threads. For example, in one embodiment, the selected thread identifier may allow for the selection of a number of threads that are derived from a common thread. In a specific example, the number of threads may be all threads occurring as a result of, for example, a particular user action, such as for example, switching a program from offline to online mode. However, this is merely one illustrative to which the disclosed subject matter is not so limited.

In one embodiment, the performance manager 130 may be configured, during operation, to filter the information collected by the plurality of performance monitors utilizing the selected thread. In one embodiment, the performance manager 130 may compare the executed thread identifier 114 with the selected thread identifier 120, and if the values of the two are substantially equivalent, instruct the performance monitor 116 to collect information related to the performance of the execution unit 110. Conversely, in one embodiment, if the executed thread identifier 114 and the selected thread identifier 120 are not equivalent, the performance manager 130 may instruct the performance monitor 116 to not collect information. It is understood that in various embodiments, the performance manager may not be configured to control individual performance monitors, but may control the plurality of performance monitors 114, 114' & 114" as a whole, or by subsection.

In another embodiment, the filtration may not occur as the information is collected by the performance monitor 114, but instead after the information has been collected. In one embodiment, a performance monitor 116, 116' or 116" may collect performance information regarding all executed threads, but may correlate the information by thread. The performance manager may then filter the plurality of available information related to the plurality of instruction threads 104 by utilizing the selected thread identifier 120. It is understood that these are merely two illustrative embodiments and that other embodiments are within the scope of the disclosed subject matter. In addition, further details and embodiments, of the program manager 130 are discussed below in reference to FIG. 2.

In one embodiment, the system 100 may include a performance reporter 140. In one embodiment, the performance reporter 140 may be configured to report the performance information collected by one or more performance monitors 116, 116' & 116" that is related to the selected thread, as indicated by the selected thread identifier 120. In one embodiment, the performance reporter 140 may make the information available to a user via a software interface. In one embodiment, the performance monitor 140 may actively change the available performance information as either the information of the selected thread change. In another embodiment, the performance reporter 140 may allow an interface by which a user may select between a plurality of data. In one embodiment, the performance reporter 140 may filter the available information based, at least in part, upon the selected thread. In one embodiment, the performance manager 130 may include the performance reporter 140.

Figure 2:
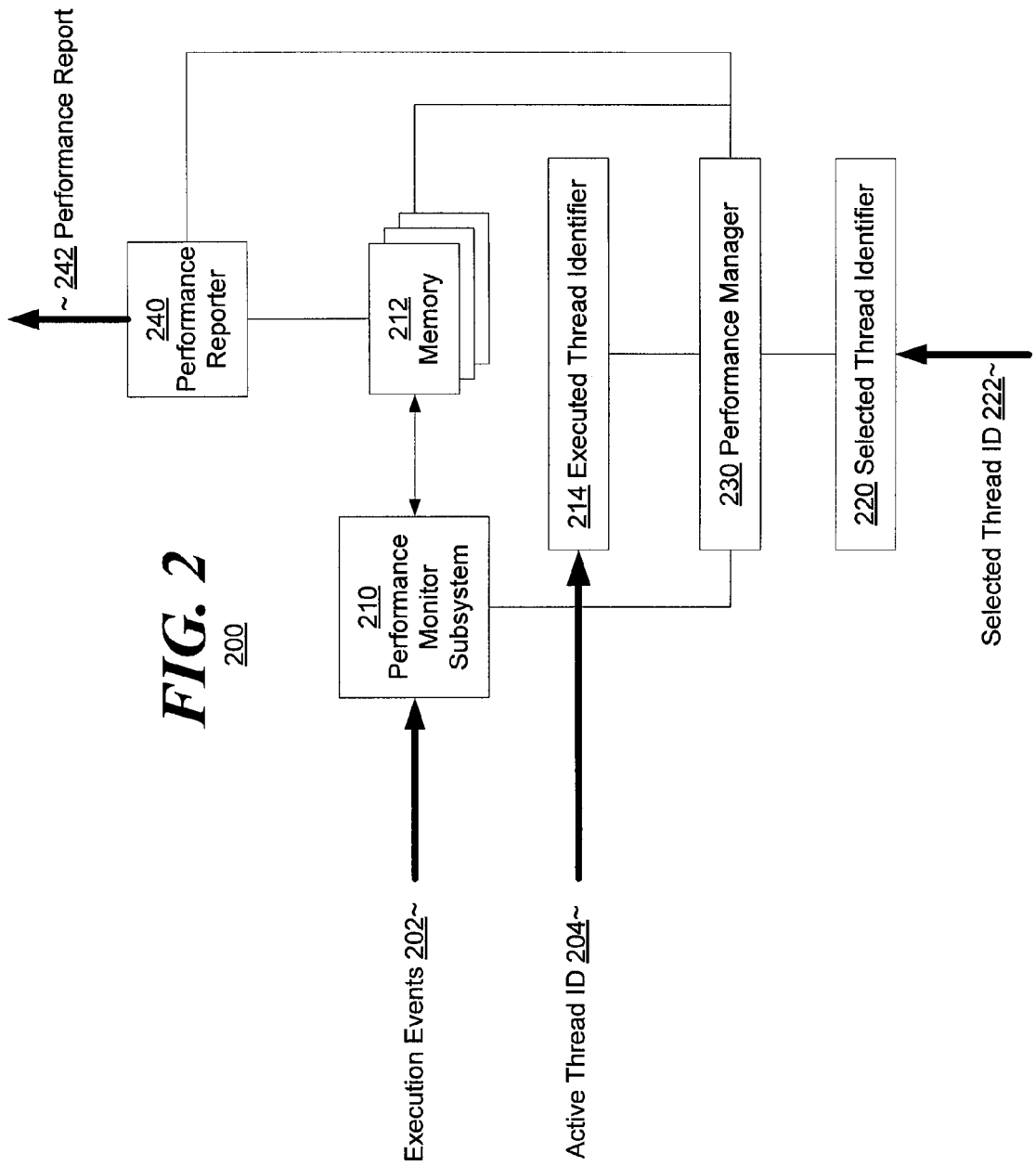
FIG. 2 is a block diagram of an embodiment of a system for the monitoring of processor performance in accordance with the disclosed subject matter.

FIG. 2 is a block diagram of an embodiment of a performance monitoring system 200 for the monitoring of processor performance in accordance with the disclosed subject matter. In one embodiment, the performance monitoring system 200 may include a selected thread identifier 220, at least one memory 212, a performance monitoring subsystem 210, and a performance reporter 240.

In one embodiment, the selected thread identifier 220 may be configured to indicate an instruction thread that is to be monitored. In one embodiment, each or many performance monitoring subsystems 210 may include a selected thread identifier 220. In such an embodiment, the performance of different execution units may be monitored for different threads. In other embodiments, the selected thread identifier 220 may be shared amongst all of the performance monitoring subsystems 210. In such an embodiment, the performance of all execution units may be monitored for a selected thread.

In one embodiment, the executed thread identifier 214 may be configured to indicate the instruction thread currently being executed by a particular execution unit. In one embodiment, the executed thread identifier 214 may be part of the execution unit. In another embodiment, the executed thread identifier 214 may be part of the performance monitoring system 200. In one embodiment, the processor may include a single or limited number of executed thread identifiers 214 that may be shared amongst multiple execution units. In one embodiment, the executed thread identifier 214 may receive an active thread identification (ID) 204 from the executed thread identifier's associated execution unit. In one embodiment, as the execution transitions from one active instruction thread to another, the execution unit may update the value stored within the executed thread identifier 214.

In one embodiment, the performance monitor subsystem 210 can be configured to monitor at least one aspect of the execution of an instruction thread by an execution unit and to generate performance information related to the monitored aspects. In one embodiment, the performance monitor subsystem 210 may be associated with a single execution unit. However, other embodiments may exist where the performance monitor subsystem 210 is shared amongst a number of execution units. For example, in one embodiment, a particular performance monitor subsystem 210 may monitor execution events that occur or relate to multiple execution units, such as, system interrupts.

In one embodiment, the performance monitor subsystem 210 may be configured to monitor execution aspects by receiving notice of execution events 202 from the monitored execution unit. In one embodiment, the performance monitor subsystem 210 may monitor as plurality of events or execution aspects. For example, in one embodiment, a performance monitor subsystem 210 associated with a branch prediction unit may monitor execution events, such as, for example, conditional and unconditional branches taken, predicted, and encountered, direct and indirect branches taken, predicted, and encountered, calls, and returns, etc. However, this is merely one illustrative embodiment to which the disclosed subject matter is not limited.

In one embodiment, the performance monitoring system 200 may include at least one memory 212 configured to store the performance information related to the execution of at least one instruction thread. In one embodiment, the performance monitor 116 of FIG. 1 may include the performance monitor subsystem 210 and the memory 212.

In one embodiment, the memory 212 may include a plurality of memories, wherein each of the plurality of memories is configured to store both an instruction thread identifier and performance information related to the execution of the identified instruction thread. In one embodiment, for each active thread ID 204 a new memory pair may be used to store the execution event 202 information. A first or key memory may be used to identify what thread ID is associated with the memory pair, while a second or value memory may store the actual performance information related to the execution of the associated thread ID. In one embodiment, the performance information may be stored in the memory 212 as an associated array with the various thread IDs as the keys of the array. However, this is merely on embodiment, and the disclosed subject matter is not limited to this example embedment. It is understood that embodiments, may exist in which a single memory 212 is used for each category of performance information being monitored, and the memory 212 is shared between all threads.

In one embodiment, the performance manager 230 may be configured to control the performance monitor subsystem 210 to collect performance information related only to the selected thread. It is contemplated that various embodiments of the performance manger 230 may be utilized to provide different implementations and means of control, and are within the scope of the disclosed subject matter. A few example, non-limiting embodiments will now be described.

In one embodiment, the performance manager 230 may be configured to compare the executed thread identifier 214 with selected thread identifier 220 and, if the selected thread is not being executed, prevent the performance monitor subsystem 210 from monitoring the execution of the instruction thread. However, if the executed thread identifier 214 indicates that the selected thread identifier 220 is currently being executed by the execution unit, the performance manager 203 may instruct the performance monitor subsystem 210 to collect or monitor the execution of the instruction thread. In such an embodiment, the execution events related to non-selected threads may be ignored by the performance monitor subsystem 210. As previously mentioned, in some embodiments, each execution unit may be associated with a selected thread identifier 220. Whereas in other embodiments, the selected thread identifier 220 may be associated with the entire processor. It is contemplated that embodiments between these tow extremes may exist and are within the scope of the disclosed subject matter.

In an alternate embodiment, the performance manager 230 may be configured to detect when the executed thread identifier 214 changes to be substantially equivalent to the selected thread identifier 220, and replace the performance information stored by the memory 212 with performance information associated with the selected thread. In this embodiment, the performance manager 230 may allow the performance monitor subsystem 210 to collect performance information related to a number of threads. However, the performance manager 230 may take it upon itself to separate the performance information by instruction thread. As the execution unit begins or resumes executing the selected thread, the performance manager 230 may overwrite the existing performance information related to a non-selected thread, and replace it with last known value of the performance information related with the selected thread. In one embodiment, the performance manager 230 may replaced the non-selected performance information with a zero or starter value. Likewise, when the execution unit transitions from executing the selected thread to executing a non-selected thread, the performance manager 203 may store the last known values of the selected performance information for later use. These values may be restored if or when the execution unit transitions back to the selected thread.

In one embodiment, the performance manager 230 may be configured to store the replaced performance information associated with the non-selected thread. In one embodiment, the performance manager 230 may push or pop performance information onto or off of a stack. However, other storage techniques are contemplated and within the disclosed subject matter.

In one embodiment, the performance manager 230 may be configured to provide for dynamically changing the selected thread. In such an embodiment, the performance manager 230 may store performance information associated with multiple threads, and swap "active" or selected performance information in and out of the memory 212. In one embodiment, the performance manager 230 may utilize the system memory or general registers of the processor to store the inactive performance information. In another embodiment, the memory 212 may be sufficient to store the various sets of performance information and the performance manager 230 may merely select which portion of the memory 212 is used for each thread's associated performance information or which portion of the memory 212 is to be actively used at a given time.

In one embodiment, the performance reporter 240 may be configured to report the performance information related to the selected instruction thread. In one embodiment, a user may request that the performance reporter 204 provide the user with performance information related to a selected thread. The performance reporter 240 may then retrieve this information and report the information to the user via a performance report 242. In one embodiment, the performance reporter 240 may be configured to retrieve performance information from any or merely a subset of the performance monitor subsystems 210 or memories 212. In one embodiment, the performance reporter 240 may be configured to provide access to other non-performance related units of a system or processor. In one specific embodiment, the performance monitor 204 may include a control register access bus (CRAB) that is configured to provide access to the control registers of a processor.

In one embodiment, the performance reporter 240 may be configured to report the performance information from one of the plurality of memories 212, wherein the reported memory includes an identified thread substantially equal to the selected thread. In one embodiment, the memory 212 may include a plurality of memories, as described above, in which the performance information is stored in an associative array in which the executed thread IDs are used as keys. The performance reporter 240 may use the selected thread ID as a key to access performance information stored with the memory 212. The performance reporter 240 may then report this selected performance information to the user or as dictated by the embodiment. It is understood that this is merely one illustrative embodiment to which the disclosed subject matter is not so limited.

Figure 3:
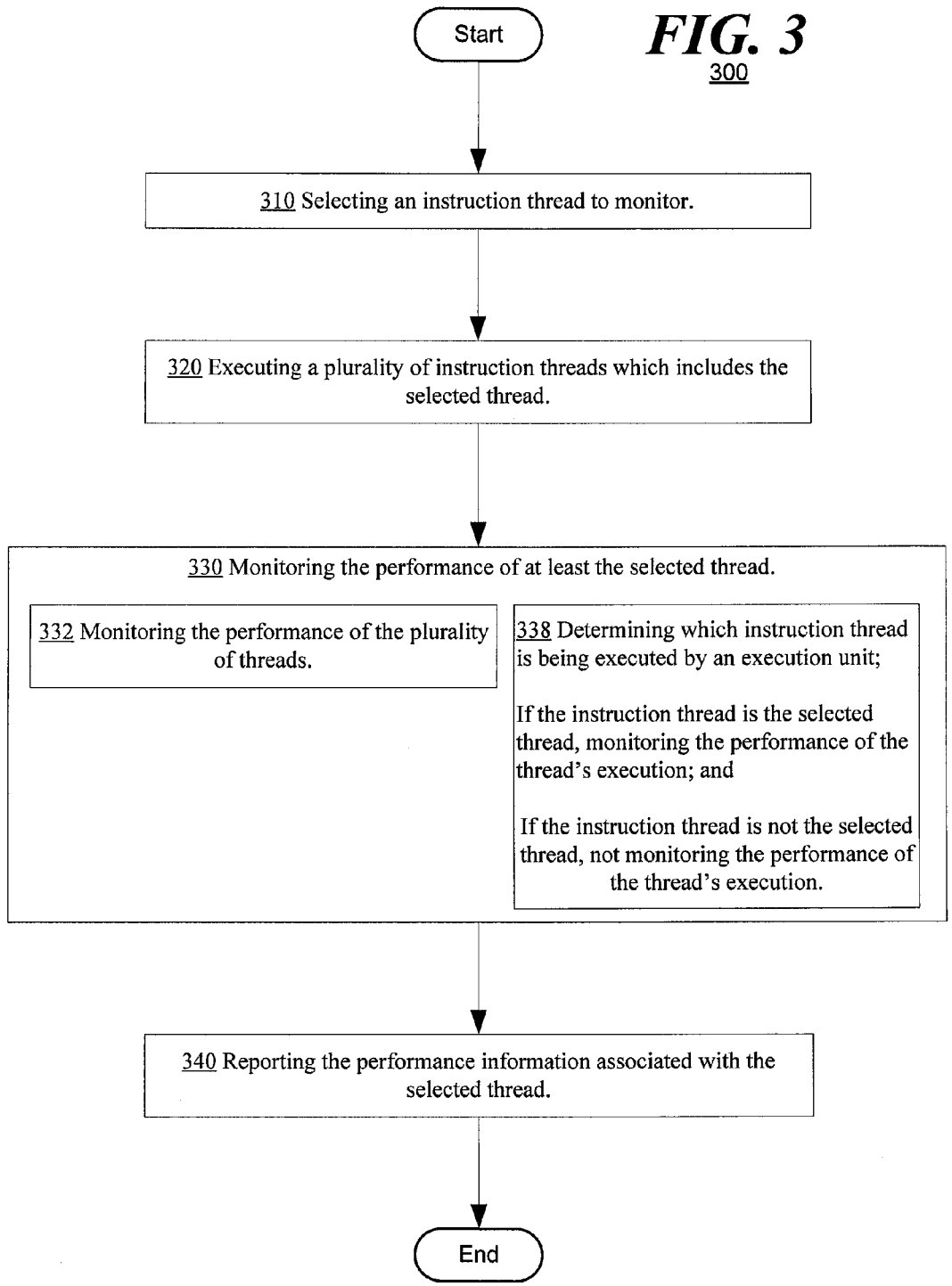
FIG. 3 is a flowchart of an embodiment of a technique for the monitoring of processor performance in accordance with the disclosed subject matter.

FIG. 3 is a flowchart of an embodiment of a technique for the monitoring of processor performance in accordance with the disclosed subject matter. Block 310 illustrates that in one embodiment, an instruction thread that is to be monitored may be selected. In one embodiment, this selection may occur as part of a deliberate action by a user or as a consequence of the occurrence of a user-configured event. In one embodiment, the selected thread identifier 120 of FIG. 1 or the selected thread identifier 220 of FIG. 2 may perform or facilitate this selection as described above.

Block 320 illustrates that, in one embodiment, a plurality of instruction threads may be executed. In one embodiment, the plurality of instruction threads may include the selected instruction thread. In one embodiment, the threads may be executed by a variety of execution units. In one embodiment, the execution units 110, 110' & 110" or the execution logic 112, 112' & 112" of FIG. 1 may perform this execution as described above. In one embodiment, the execution may result in the execution events 202 and/or active thread ID 204 of FIG. 2, as described above.

Block 330 illustrates that, in one embodiment, the performance of at least the selected thread may be monitored. In one embodiment, the monitoring may include monitoring a plurality of execution events. In one embodiment, the performance monitor 116 of FIG. 1 or the performance monitoring system 200 of FIG. 2 may result in this monitoring as described above.

Block 332 illustrates that, in one embodiment, the performance of a plurality of threads may be monitored. In one embodiment, performance monitoring may occur regardless of whether or not the currently executed thread is the selected thread. In one embodiment, the performance monitor 116 of FIG. 1 or the performance monitor subsystem 210 and the memory 212 of FIG. 2 may perform this monitoring. In another embodiment, the performance monitor 116 of FIG. 1 or the performance monitor subsystem 210 and the memory 212 of FIG. 2, respectively, may be aided by the performance manager 130 of FIG. 1 or the performance manager 230 of FIG. 2, respectively to perform this monitoring.

Block 338 illustrates that, in one embodiment, only the performance of the selected thread may be monitored. In one embodiment, if the execution unit is executing a non-selected thread the performance information associated with the non-selected thread may either be ignored or not monitored. In one embodiment, the performance manager 130 of FIG. 1 or the performance manager 230 of FIG. 2 may assist the performance monitor 116 of FIG. 1 or the performance monitoring system 200 of FIG. 2, respectively, in monitoring the performance of only the selected thread.

Block 340 illustrates that, in one embodiment, the performance information associated with the selected thread may be reported. In one embodiment, the performance information may be reported to a user. In one embodiment, the performance reporter 140 of FIG. 1 or the performance reporter 240 of FIG. 2 may report the performance information.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a plurality of execution units configured to execute, at least in part, a plurality of instruction threads;
   a plurality of performance monitors, each performance monitor being configured to collect performance information related to the execution of at least one instruction thread;
   a selected thread identifier configured to provide, during operation, the selection of at least one instruction thread; and
   a performance manager configured to instruct the performance monitors to collect performance information when the selected instruction thread is being executed, and not when a non-selected instruction thread is executed.

2. The system of claim 1 wherein each of the execution units includes a subset of the performance monitors configured to monitor events related with the execution unit.

3. The system of claim 1 wherein the selected thread identifier includes a plurality of selected thread identifiers each selected thread identifier associated with at least one execution unit, and
   wherein the performance manager is configured to, if one of the plurality of selected instruction threads is being executed by the selected instruction thread's associated execution unit, instruct one or more performance monitors also associated with the execution unit to collect performance information, and not collect information when an instruction thread not associated with the execution unit is executed.

4. The system of claim 2 wherein the selected thread identifier is configured to select an instruction thread based, at least in part, upon the occurrence of a user-configured event.

5. The system of claim 4 wherein each performance monitor includes at least one memory configured to store the performance information related to the execution of at least one instruction thread.

6. The system of claim 5 wherein the performance manager is configured to, when an execution unit begins to execute the selected thread:
   replace the current performance information stored by at least one memory, associated with the execution unit, with a selected relevant performance information associated with the selected thread.

7. The system of claim 6 wherein the performance manager is configured to store the replaced current performance information.

8. The system of claim 1 wherein the execution units comprise a executed thread identifier configured to indicate what instruction thread an executing unit is currently executing; and
   wherein the performance manager is configured to utilize, at least in part, the executed thread identifier to determine when an execution unit is executing the selected thread.

9. The system of claim 1 comprising a plurality of selected thread identifiers, and
   wherein the performance manager is configured to instruct the performance monitors to collect performance information when one of the selected instruction threads is being executed, and not when a non-selected instruction thread is executed.

10. A performance monitoring system comprising:
    a selected thread identifier configured to indicate a selected instruction thread that is to be monitored;
    a performance monitor subsystem configured to monitor at least one aspect of the execution of the selected execution thread by an execution unit, but not monitor the at least one aspect when a non-selected execution thread is executed by the execution unit, and generate performance information related to the monitored aspects;
    a memory configured to store the performance information related to the execution of at least one instruction thread; and
    a performance reporter configured to report the performance information.

11. The system of claim 10 further comprising an executed thread identifier configured to indicate the instruction thread currently being executed by the execution unit.

12. The system of claim 11 further comprising a performance manager configured to control the performance monitor subsystem to collect performance information related only to the selected thread.

13. The system of claim 12 wherein the performance manager is configured to compare the executed thread identifier and selected thread identifier and, if the selected thread is not being executed, prevent the performance monitor subsystem from monitoring the execution of the instruction thread.

14. The system of claim 12 wherein the performance manager is configured to:
    detect when the executed thread identifier changes to be substantially equivalent to the selected thread identifier: and replace the performance information stored by the memory with performance information associated with the selected thread.

15. The system of claim 14 wherein the performance manager is configured to store the replaced performance information.

16. The system of claim 11 wherein the memory includes a plurality of memories, wherein each of the plurality of memories is configured to store both an instruction thread identifier and performance information related to the execution of the identified instruction thread.

17. The system of claim 16 wherein the performance reporter is configured to report the performance information from one of the plurality of memories, wherein the reported memory includes an identified thread substantially equal to the selected thread.

18. A machine readable medium being tangibly embodied on a non-transitory computer-readable medium and comprising instructions capable of being executed by at least one machine, wherein when executed instructions cause the machine to: select an instruction thread to monitor;
   execute a plurality of instruction threads, wherein the plurality of instruction threads includes the selected thread;
   monitor only the performance of the selected thread and not monitor the performance of non-selected threads, to generate performance information associated with the selected thread; and
   report the performance information associated with the selected thread.

19. The instructions of claim 18 wherein the instructions to monitor include instructions to monitor the performance of the plurality of threads, and wherein the instructions to report include instructions to report only the performance information associated with the selected thread.

20. The instructions of claim 18 wherein the instructions to monitor include instructions to:
   determine which instruction thread is being executed by an execution unit;
   if the executed instruction thread is equivalent to the selected thread, monitor the performance of the executed instruction thread's execution; and
   if the executed instruction thread is not the selected thread, to not monitor the performance of the executed instruction thread's execution.

* * * * *